United States Patent [19]

Schuhmacher

[11] Patent Number: 5,039,273

[45] Date of Patent: Aug. 13, 1991

[54] CONVEYOR SYSTEM FOR A CONTAINER

[75] Inventor: Ernst Schuhmacher, Homburg-Einöd, Fed. Rep. of Germany

[73] Assignee: Deere & Company, Moline, Ill.

[21] Appl. No.: 445,080

[22] Filed: Dec. 1, 1989

[30] Foreign Application Priority Data

Dec. 3, 1988 [DE] Fed. Rep. of Germany ....... 3840826

[51] Int. Cl.⁵ ........................................... A01D 87/02
[52] U.S. Cl. ........................ 414/679; 56/16.6; 56/DIG. 5; 414/301; 414/302; 414/313; 414/326; 414/505; 414/507; 414/528
[58] Field of Search ............... 414/503, 505, 507, 526, 414/679, 504, 287, 293, 294, 301, 302, 306, 307, 310, 325, 326, 296, 313, 315, 316, 323, 507, 528; 222/229; 56/16.6, 202, DIG. 5, 16.4

[56] References Cited

U.S. PATENT DOCUMENTS

| | | | |
|---|---|---|---|
| 2,511,246 | 6/1950 | Chamberlin | 414/503 X |
| 2,648,461 | 8/1953 | Stephenson | 414/526 X |
| 3,263,836 | 8/1966 | Kucera | 414/507 X |
| 3,448,566 | 6/1969 | Van Derley . | |
| 3,511,399 | 5/1970 | Sammarco | 414/503 |
| 3,720,052 | 3/1973 | Anderson et al. | 414/504 X |
| 3,794,190 | 2/1974 | Lambert, Jr. | 414/302 X |
| 4,029,228 | 6/1977 | Shaver | 414/301 X |
| 4,170,311 | 10/1979 | Spaw | 414/289 |
| 4,433,707 | 2/1984 | Farnham | 414/301 X |
| 4,516,285 | 5/1985 | Pineau | 414/301 X |
| 4,537,553 | 8/1985 | Andersson | 414/302 |
| 4,773,808 | 9/1988 | Fischer et al. | 414/302 X |
| 4,954,036 | 9/1990 | Walker | 414/293 X |

FOREIGN PATENT DOCUMENTS

| | | | |
|---|---|---|---|
| 268143 | 1/1969 | Austria | 414/503 |
| 1088874 | 4/1957 | Fed. Rep. of Germany | 414/310 |
| 1167091 | 7/1964 | Fed. Rep. of Germany . | |
| 6809755 | 12/1968 | Fed. Rep. of Germany . | |
| 6750597 | 1/1969 | Fed. Rep. of Germany . | |
| 2063168 | 7/1971 | Fed. Rep. of Germany . | |
| 1951498 | 9/1971 | Fed. Rep. of Germany . | |
| 1757695 | 2/1972 | Fed. Rep. of Germany . | |
| 2639681 | 3/1978 | Fed. Rep. of Germany . | |
| 134908 | 4/1979 | Fed. Rep. of Germany | 414/326 |
| 1482128 | 5/1979 | Fed. Rep. of Germany . | |
| 2908268 | 9/1979 | Fed. Rep. of Germany . | |
| 3636006 | 5/1988 | Fed. Rep. of Germany | 414/326 |
| 3743659 | 7/1989 | Fed. Rep. of Germany | 414/302 |
| 417208 | 1/1967 | Switzerland | 414/503 |

Primary Examiner—Robert J. Spar
Assistant Examiner—Robert S. Katz

[57] ABSTRACT

Grain tanks of harvesting machines frequently have an irregularly shaped interior which is difficult to fill completely and to unload. A conveyor system is proposed facilitating loading and unloading of the grain tank. The conveyor system comprises a conveyor arrangement which contains conveyor elements that can be driven and that can be moved vertically depending on the height of the crop deposit. The conveyor arrangement is mounted to the interior wall of the grain tank by a four bar linkage. During the filling process, the conveyor elements act as distributors filling in unused areas of the grain tanks. During the unloading process, they act as conveyors directing grain to the unloading auger.

12 Claims, 10 Drawing Sheets

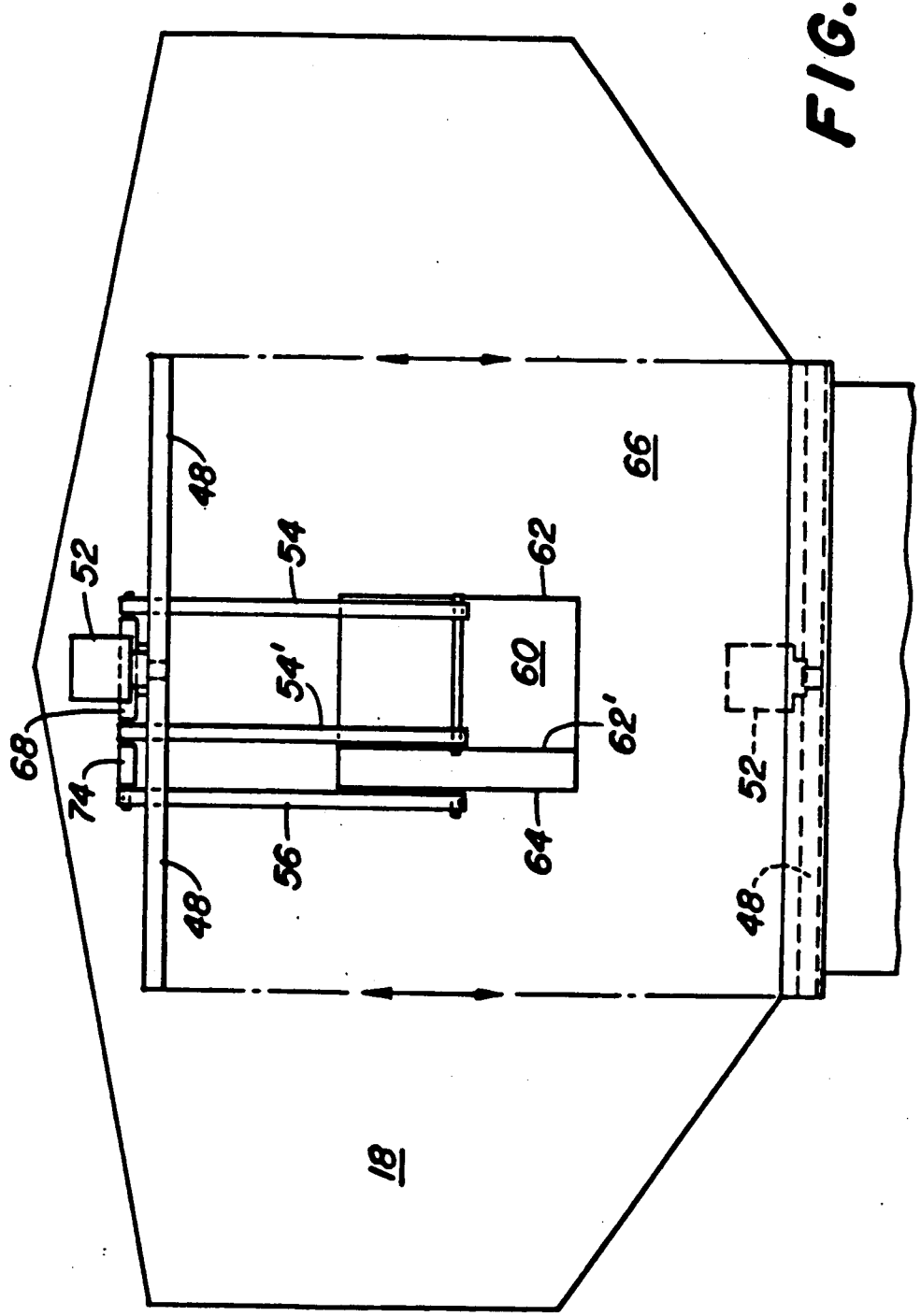

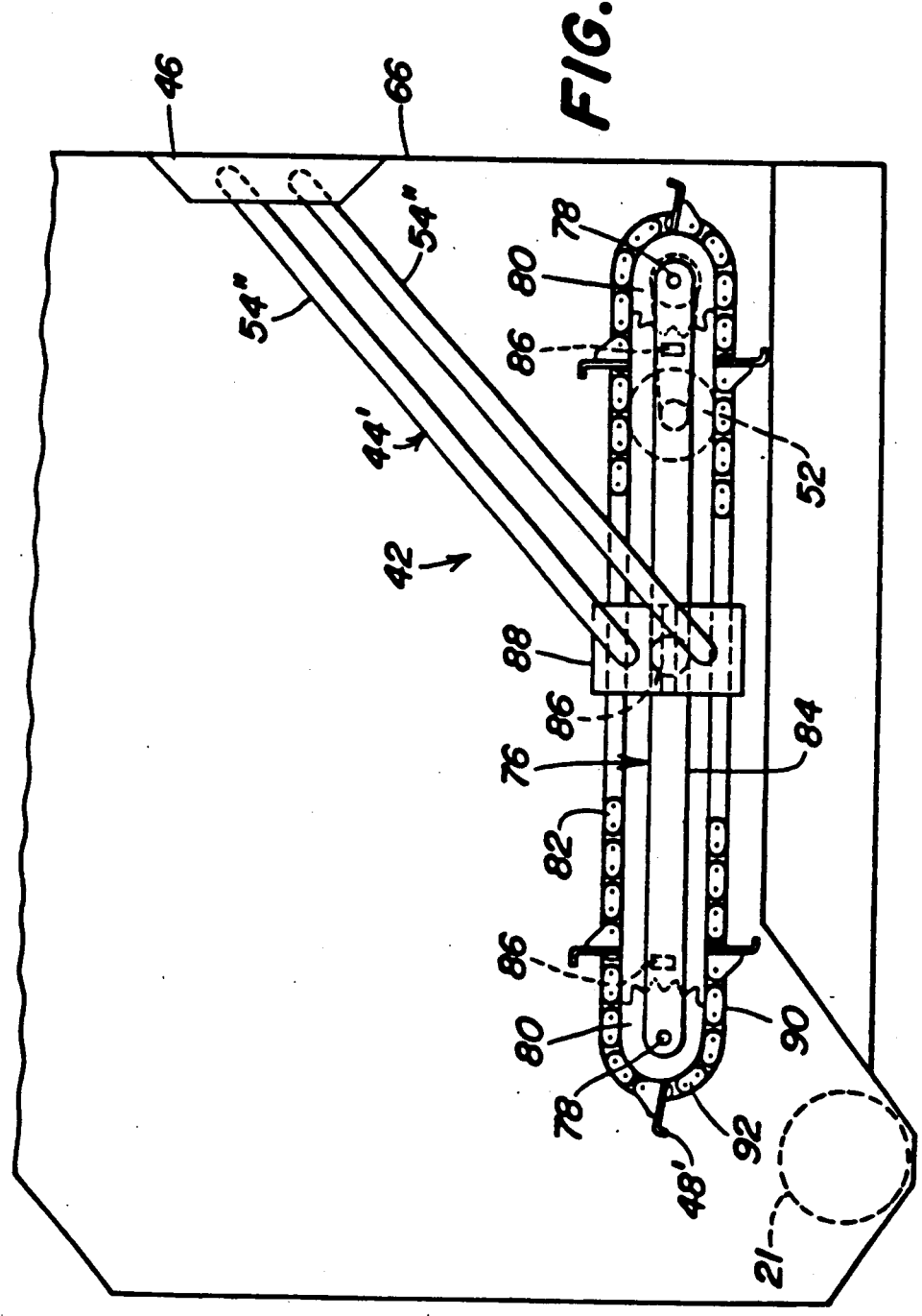

CONVEYOR SYSTEM FOR A CONTAINER

BACKGROUND OF THE INVENTION

1. Field of the Invention

The invention is directed to a conveyor system for a container. The conveyor system is particularly useful for a grain bin of a harvesting machine.

2. Description of the Prior Art

It is sometimes difficult to completely empty or completely fill containers with free-flowing crop. This is because the crop may flow poorly and may not flow into all available space or into an unloading arrangement. Hence, conveyor systems and containers have assumed the most varied configurations for the purpose of at least spreading the crop within the container.

For example, a container according to DE PS 29 08 268 or according to U.S. Pat. No. 34,48,566 is provided with a scraper chain conveyor above each unloading screw conveyor, in order to move the crop towards the unloading screw conveyor during the unloading process.

The DE OS 26 39 681 discloses a charging arrangement for a container with a swinging conveyor gutter that delivers the crop for distribution uniformly across the entire container.

DE AS 14 82 128 and DE AS 11 67 091 each disclose a container that can be tilted about an axis in order to increase the inclination of the bottom of the container and therewith the ability of the crop to slide, while the permanent inclination of the container bottom is omitted during the filling process.

Finally DE AS 19 51 498, DE OS 20 63 168, DE-GM 67 5097, DE-GM 68 09 755 and DE-OS 17 57 695 suggest that the container volume and the inclination of individual container parts be varied selectively in order to obtain better utilization of the container volume.

All these arrangements have not proved to be practical. They can be realized only with difficulty when one considers that grain tanks of present-day combines have a capacity of up to 8000 liters of grain, that is, about 6.5 tons.

SUMMARY

The problem overcome by the present invention is that of creating a conveyor system that is capable of moving large amounts of crop material and dealing with the loading and unloading process of the container with a minimum of parts.

The present invention comprises a conveyor arrangement that can be used for the uniform distribution of crop material within a container. The conveyor arrangement also supplies the unloading screw conveyor or similar device with crop material depending on the position of the conveyor arrangement. It can, at any time, occupy positions or be brought into such positions, in which it is required to move only a minimum amount of crop material, so as to save energy.

Optimization of the load on the conveyor arrangement and its energy consumption is obtained by controlling: the amount of penetration into the crop material, the time of operation, the conveyor efficiency, the pressure on the crop deposit and similar factors, depending upon the height of the crop deposit in the container. The range of operation of the conveyor arrangement can be limited by stops, limit switches, etc., and a relay can be used to control an overrun phase.

An uniform distribution of the crop is obtained when the conveyor arrangement moves from top to bottom and bottom-to-top to convey the crop in a more or less horizontal plane without ejecting any crop from an open container.

In the simplest means of following the level of the crop deposit, the conveyor arrangement is brought into contact with the peak of the cone of repose and, if necessary, sinkage into the crop deposit is prevented by sliding contact feet or similar means. Guides may be provided on the container for the conveyor arrangement so that it does not perform any uncontrolled movements on extremely free-flowing crop due to the shape of the cone of repose.

The amount of pressure applied by the conveyor arrangement upon the crop deposit or to what degree it sinks into the crop can be determined by a control device The simplest form of control device is an extension or a compression spring, which absorbs the principal load of the conveyor arrangement requiring only minor forces to raise or lower the conveyor arrangement. A solution that is technically more costly, but more adaptable in its application is that of a control or regulating arrangement, which also permits a change in the contact pressure immediately before the end of the unloading process in order to increase the flow to an unloading arrangement.

If the drive for the conveyor is provided by a separate motor, for example a hydraulic motor, that is connected only by hoses to an energy source (pump), the mobility of the conveyor arrangement will be limited by only a minimal amount. Nevertheless, the drive can also be provided by chains, belts, flexible shafts or similar devices. In addition, a hydraulic motor has the advantage that it can be controlled very simply in its drive direction, speed and output. The amount conveyed, the direction of conveyed material and the area covered during the conveying operations can be varied by the inclination of the conveyor arrangement. In this way, the conveyor elements of a scraper chain conveyor, which are configured as blades, may be oriented more or less perpendicular to the direction of the conveying operation. Similarly, the conveyor elements of a conveyor arrangement configured as a rotor may be tilted about their longitudinal axis. Instead of a scraper chain conveyor equipped with blades, other types of conveyors may be used, such as circulating endless chain conveyors using rubber belts. Furthermore, the direction of conveying and the aggressiveness of the conveyor can be varied by tipping the rotor from its generally vertical axis of rotation into a plane inclined thereto.

If the cross sectional shape of the container is irregular, or if the area is so large that a single conveyor arrangement is inadequate, it is appropriate to provide several conveyor arrangements, whose areas of operation overlap.

It is also possible to move the conveyor elements or the conveyor arrangement in directions other than vertical, in order to reach "dead" spaces. In order to supply side areas, the conveyor elements may be equipped with guide elements, such as paddles, deflectors, guide vanes, etc., which can resolve the total direction of conveying into two component directions. Similarly, the conveyor elements may be shaped, for example, by flanging the end of the blades.

The conveyor elements may be designed stiff as well as flexible, where the latter may deflect during an overload situation.

Since the conveyor arrangement is in contact with the crop deposit, it provides a good indication of the level of the cone of repose. This information may be transmitted by a warning arrangement to an operator, to stop further delivery of crop. Finally, this can be used to stop the entire threshing operation of a combine.

The use of a control device operated hydraulically or pneumatically for the vertical adjustment of the conveyor arrangement makes it possible, together with an electronically operated control or regulating device, to vary the conveying action of the conveyor arrangement by raising or lowering the operating pressure. Here a direct relationship can be maintained between the operating pressure in the control device and the conveyor drive motor, so that, in the case of high crop flow or excessively deep penetration of the conveyor element into the crop deposit, the operating pressure of the motor may be increased and this increase is transmitted directly or indirectly to the control device in order to raise the conveyor arrangement.

The configuration of the control device as a double-acting motor, in particular, a hydraulic cylinder, makes it possible to increase the pressure of the conveyor arrangement upon the crop deposit towards the end of the unloading process so as to maintain the unloading flow at a constant value while the amount of crop is decreasing.

BRIEF DESCRIPTION OF THE DRAWINGS

The drawings show a number of embodiments of the invention that are described in greater detail below.

FIG. 3 shows a front view of the conveyor arrangement of FIG. 2.

FIG. 5 shows a side view of the container of FIG. 1 with a conveyor arrangement configured as a scraper chain conveyor.

DETAILED DESCRIPTION

Figure 1:
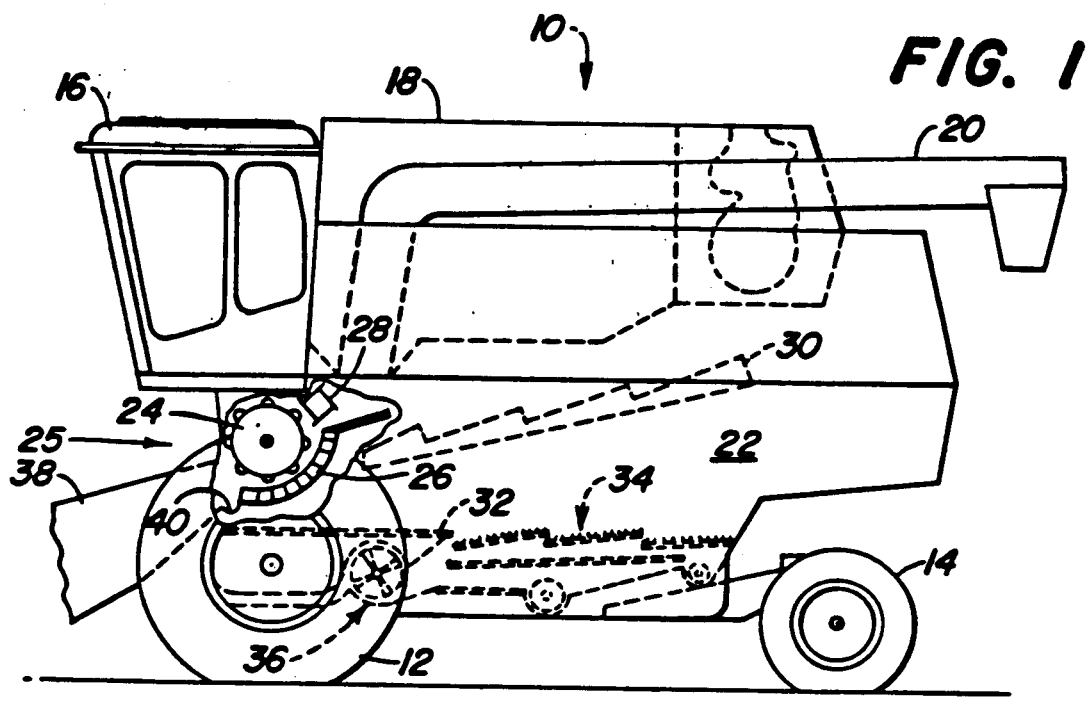
FIG. 1 shows a harvesting machine with a container that accepts a conveyor system according to the invention.

Harvesting machine 10, such as a combine, is supported on the ground by front and rear wheels 12 and 14 and hence follows the contours of the ground. Harvesting machine 10 is controlled by an operator from operator's cab 16. The operator's job consists of optimizing the intake of the crop while observing the speed and the acceptable losses. Container 18 is located behind operator's cab 16 into which the harvested and threshed crop is delivered In a combine, grain or other seeds in the container can be transferred to a trailer by means of outlet pipe 20 and unloading arrangement 21 (see FIG. 2). In addition, harvesting machine 10 contains housing 22 which accommodates intake device 25, consisting of a threshing cylinder 24, concave 26, beater 28, several straw walkers 30, conveyor arrangement 32, cleaning shoe 34 and blower 36. The crop collected by an input device, not shown, such as a harvesting platform or a picker, is transported by feederhouse 38 to housing 22 and threshed, separated and cleaned by means of the aforementioned components.

Intake device 25 extends across the entire width of housing 22. The intake device is charged with crop to be threshed across its entire width under normal conditions when operating on generally horizontal terrain. The concave is provided with openings, through which the threshed crop can be delivered to conveyor arrangement 32 in its forward region. Crop that is separated by means of straw walkers 30 is thrown from the left end of straw walkers 30 in FIG. 1, upon the forward, or at least the center region of conveyor arrangement 32. Conveyor arrangement 32, as do conventional conveyor arrangements, transports the threshed crop, which is still mixed with impurities, straw, parts of hulls, etc., from left to right in FIG. 1, from intake device 25 to cleaning shoe 34. The cleaning shoe consists of sieves which separate the useful crop from the impurities. An air flow, generated by blower 36, is blown through cleaning shoe 34 and expels the generally lighter, useless components of the crop mixture out the rear end of harvesting machine 10. The useful part of the crop, that is cleaned by cleaning shoe 34 is moved by an elevator, not shown, to container 18. The crop material is temporarily stored in container 18 and in turn is unloaded therefrom.

FIGS. 2-11 show conveyor system 40 according to the invention in various embodiments, arranged within container 18. Conveyor system 40 consists generally of conveyor arrangement 42, linkage 44 and mount 46.

Conveyor arrangement 42 is composed of several conveyor elements 48, conveyor element carrier 50 and motor 52, all of which are carried by the linkage 44, and which can be moved from top-to-bottom, as seen in the FIG. 1, and from bottom-to-top.

In this embodiment, linkage 44 consists of three arms 54, 54' (FIGS. 3 and 4) and 56, one end of each is pivotally attached to mount 46. The other end is pivotally attached to conveyor element carrier 50. Arms 54, 54' are configured identically and are arranged symmetrically about the axis of rotation of conveyor element carrier 50. Arm 56 is attached to carrier element 50, offset to one side, to the left in FIG. 2, in order to form a support against tipping of conveyor arrangement 42. The result is a four-bar linkage that manipulates conveyor arrangement 42 in such a way that the plane traversed by conveyor elements 48 remains parallel to itself in every vertical position of conveyor arrangement 42. However, this is not mandatory, and the various planes may be inclined to each other to a certain degree.

Figure 2:
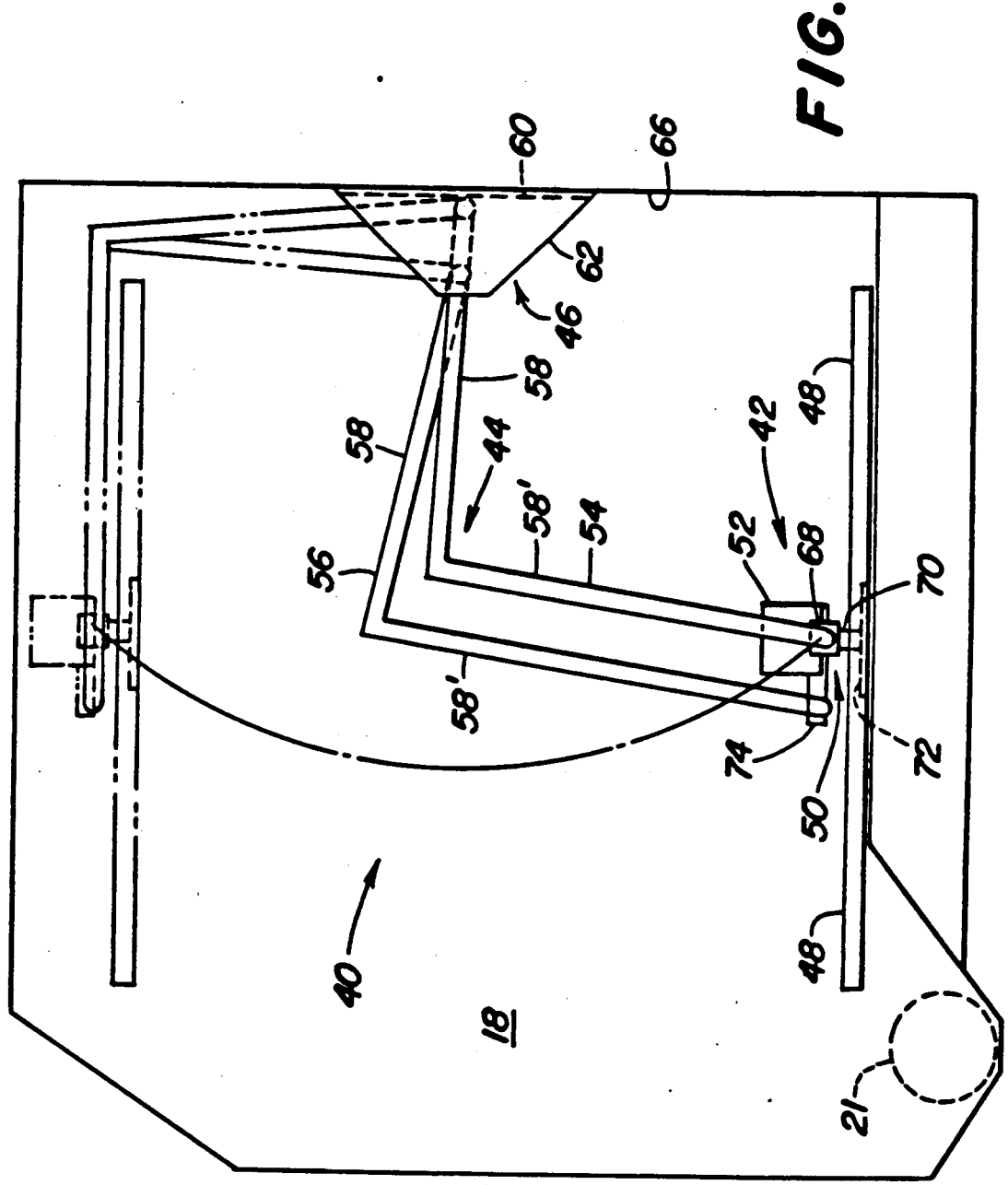
FIG. 2 shows a side view of the container of FIG. 1 with a conveyor arrangement configured as a rotor of the conveyor system.

Arms 54, 54' and 56 are each configured as levers with two segments 58, 58'. Segments 58, 58' are oriented at an angle of approximately 90° to each other. The length of both segments 58, 58' is slightly greater than the length of conveyor elements 48, which corresponds to the radius of the circular surface traversed. So that, in both end positions of conveyor arrangement 42, conveyor elements 48 do not come into contact with arms 54, 54' and 56. Arms 54 and 54' provide support and sideways guidance for conveyor element carrier 50, while arm 56, which is offset thereto, provides parallel guidance for conveyor arrangement 42. As can be seen in FIG. 2, conveyor elements 48 with conveyor element carrier 50 move in a circular path about the attachment points of arms 54, 54' and 56 at mount 46 between the upper and lower end positions.

Mount 46 consists generally of plate 60 and three brackets 62, 62' and 64 are provided with holes that provide for the pivotal attachment of arms 54, 54' and 56. The hole for arm 56 is located at a greater distance from wall 66 compared to the two other holes.

Figure 4:
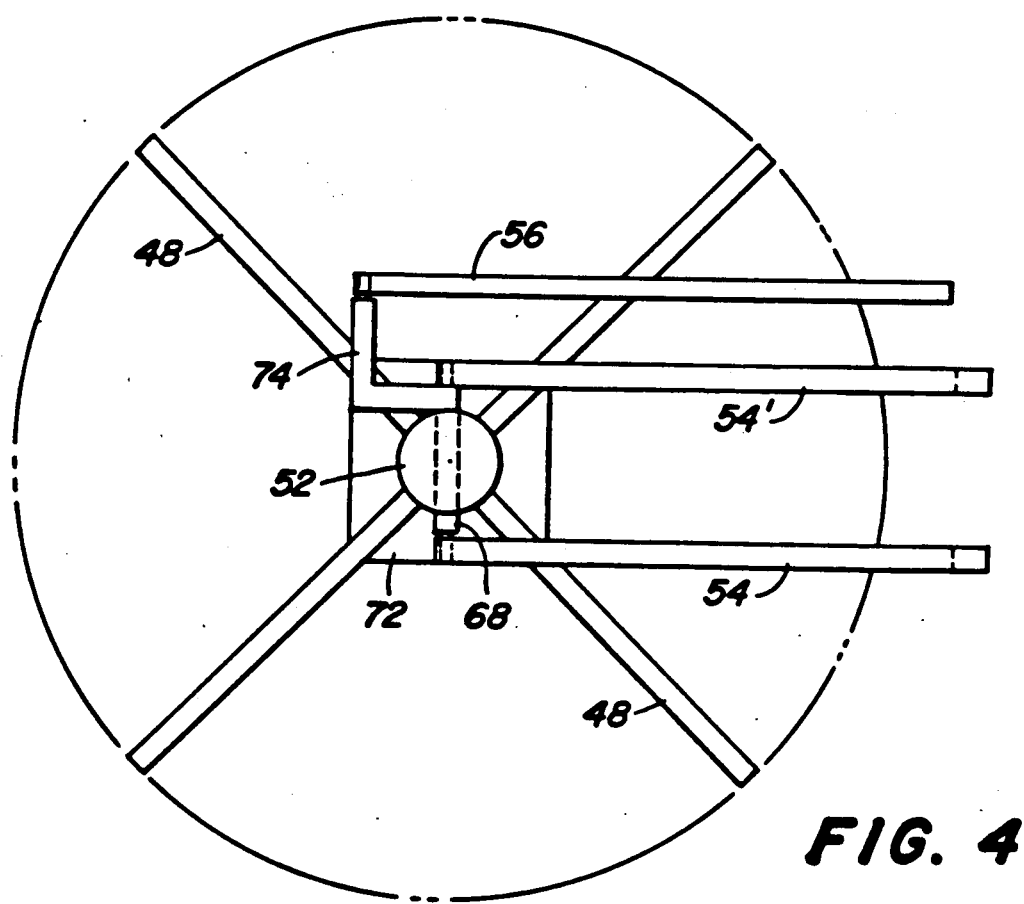
FIG. 4 shows a plan view of the conveyor arrangement of FIG. 2.
Figure 9:
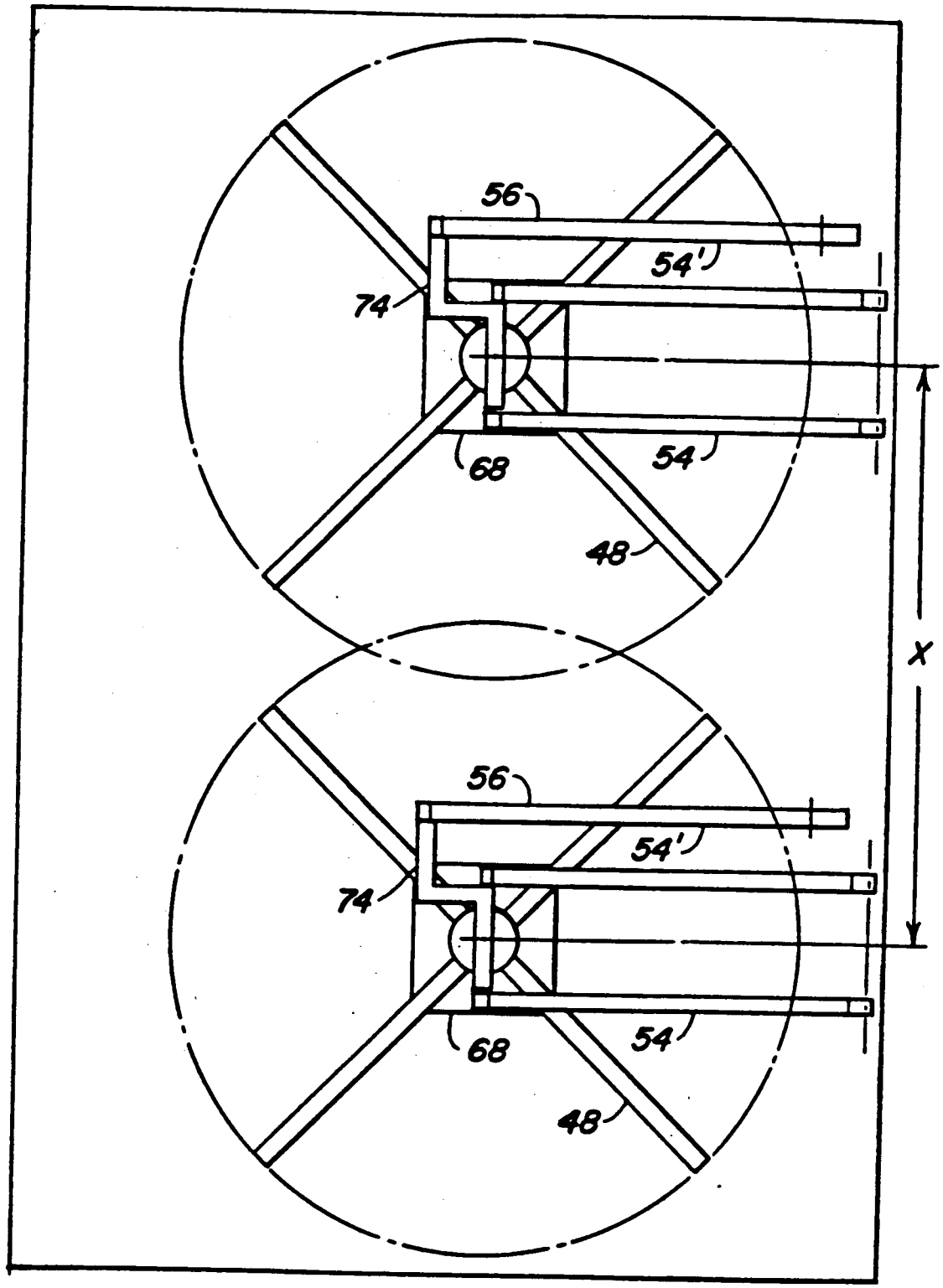
FIG. 9 shows a plan view of a double conveyor arrangement.

In this embodiment, conveyor elements 48 are configured as rotor blades that are attached to and extend radially from conveyor element carrier 50. This arrangement can be seen clearly in FIG. 4. A total of four conveyor elements 48 are provided, which traverse a circular plane during operation, as indicated in FIG. 4. Conveyor elements 48 may be made from a rigid material, such as steel, aluminum, wood or the like; or from a flexible material, that is sufficiently stiff, such as reinforced rubber, composite plastic rods or the like. For the sake of design simplicity, conveyor elements 48 are rigidly attached to conveyor element carrier 50. It is possible, however, in the case of rigid conveyor elements 48, to attach these to conveyor element carrier 50 so that they may pivot about their longitudinal axis, in order to vary their conveying efficiency. The length of conveyor elements 48 and therewith the radius, or the diameter of the circular surface traversed, are selected so that, if possible, the entire interior of container 18 is covered. In a further embodiment, not shown, conveyor elements 48 may be guided at their inner ends along a curved path so that they move in a radial direction during the rotation. By this means, a rectangular or square surface may be traversed. In addition, a plurality of overlapping conveyors 42 may be employed as illustrated in FIG. 9.

In this embodiment, conveyor element carrier 50 is designed as carrier 68, with journal 70 vertical thereto, which is free to rotate, and connected to motor 52 and disk 72. Conveyor elements 48 are attached to disk 72 by conventional means.

Carrier 68 extends generally parallel to the plane traversed by conveyor elements 48. The carrier is equipped at its outer side with journals, bearings, joints or similar devices, that permit the attachment to pivot relative to arms 54, 54' and 56. As can be seen in FIG. 4, the attachment of arm 56 to carrier 68 provides the aforementioned offset and hence does not lie in line with the two other attachment points.

In this embodiment, motor 52 is configured as a hydraulic motor that is supplied with pressurized oil from a pump through hoses, not shown. In the preferred embodiment, the hydraulic system of motor 52 is so arranged that its rotational speed, its operating pressure, and its direction of rotation may be varied. This can be accomplished by the use of appropriate control valves or by the use of variable displacement pumps. Furthermore, control or regulation of the direction of rotation of motor 52 or the beginning of operation of the pump can be accomplished by a conventional mechanical linkage or an electrically operated control device, in particular a solenoid operated valve. The use of an electrically operated control device permits the application of an electric control circuit by means of which the operation of motor 52 can be controlled in relation to the degree of fill of container 18 or similar criteria. Motor 52 is provided with a coupling, not shown, used to lock it against rotation to journal 70. Motor 52 itself, or its housing, is flanged and attached rigidly to carrier 68, and hence moves up and down with conveyor elements 48.

Between linkage 44, arms 54, 54', 56, a control device may be provided that can either be controlled externally or operated with internal power. The control device controls the contact pressure of conveyor arrangement 42 upon the cone of repose of the crop deposit. Under certain circumstances and with some types of crop such a control may be helpful or even necessary, if it is required to avoid either excessive penetration by the conveyor elements 48 into the crop deposit or insufficient penetration thereof. The control device may also be used to provide a contact pressure that varies with the height of the crop in container 18, so that during an unloading operation the contact pressure is low when the container 18 is full, and increases the more conveyor arrangement 42 approaches the bottom. By this means compensation is provided for the reduced contact pressure caused by the diminishing height of the crop deposit and the volume of the crop deposit.

Figure 6:
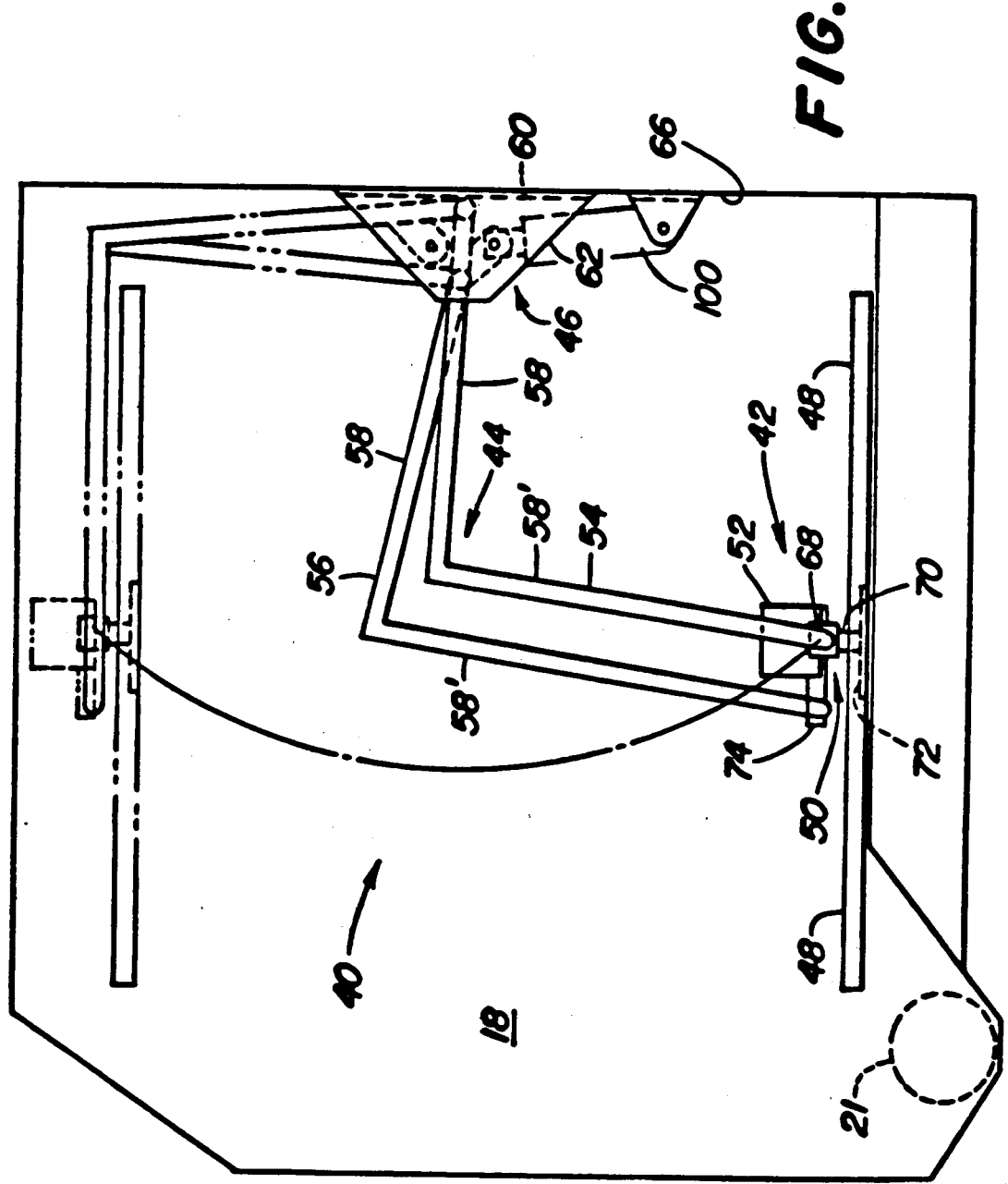
FIG. 6 shows a side view of the container of FIG. 1 having a hydraulic cylinder control device.
Figure 10:
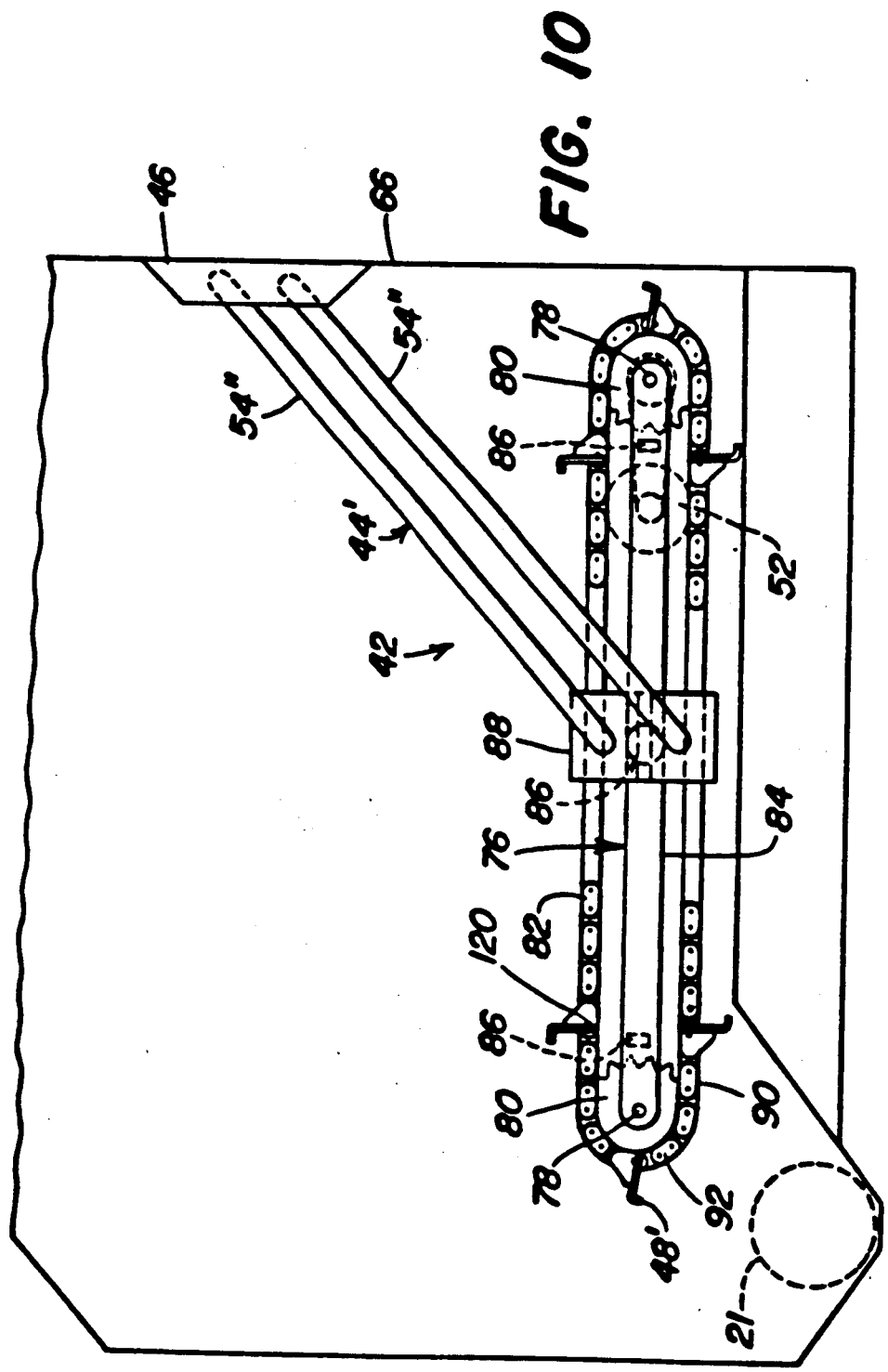
FIG. 10 shows a scraper chain conveyor similar to the one illustrated in FIG. 5 having pivotable conveyor elements.
Figure 11:
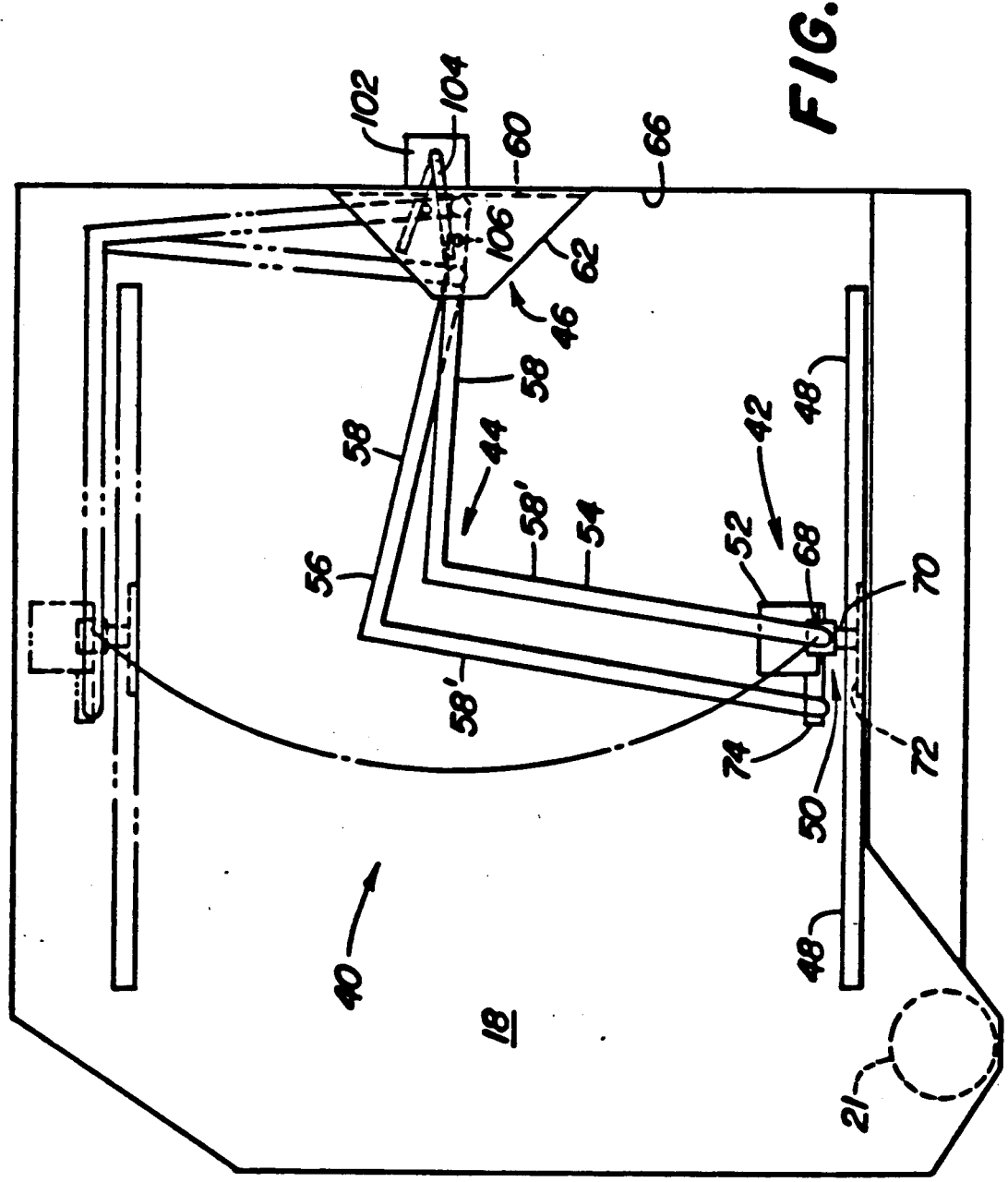
FIG. 11 shows a side view of the container of FIG. 1 having a position sensor.

The control device may be configured as a hydraulic, pneumatic or electric motor, which is operated depending on control signals. FIG. 6 illustrates a control device comprising a hydraulic cylinder 100. The control signals are generated by sensors that detect the height of the crop deposit, which may sense the height directly or react to the relative position of conveyor arrangement 42. Such a sensor is illustrated in FIG. 10. Electronic sensor 102 detects the position of segment 58 by sensing arm 104 which is rotated relative to sensor 102 by pin 106 projecting from segment 58.

Figure 7:
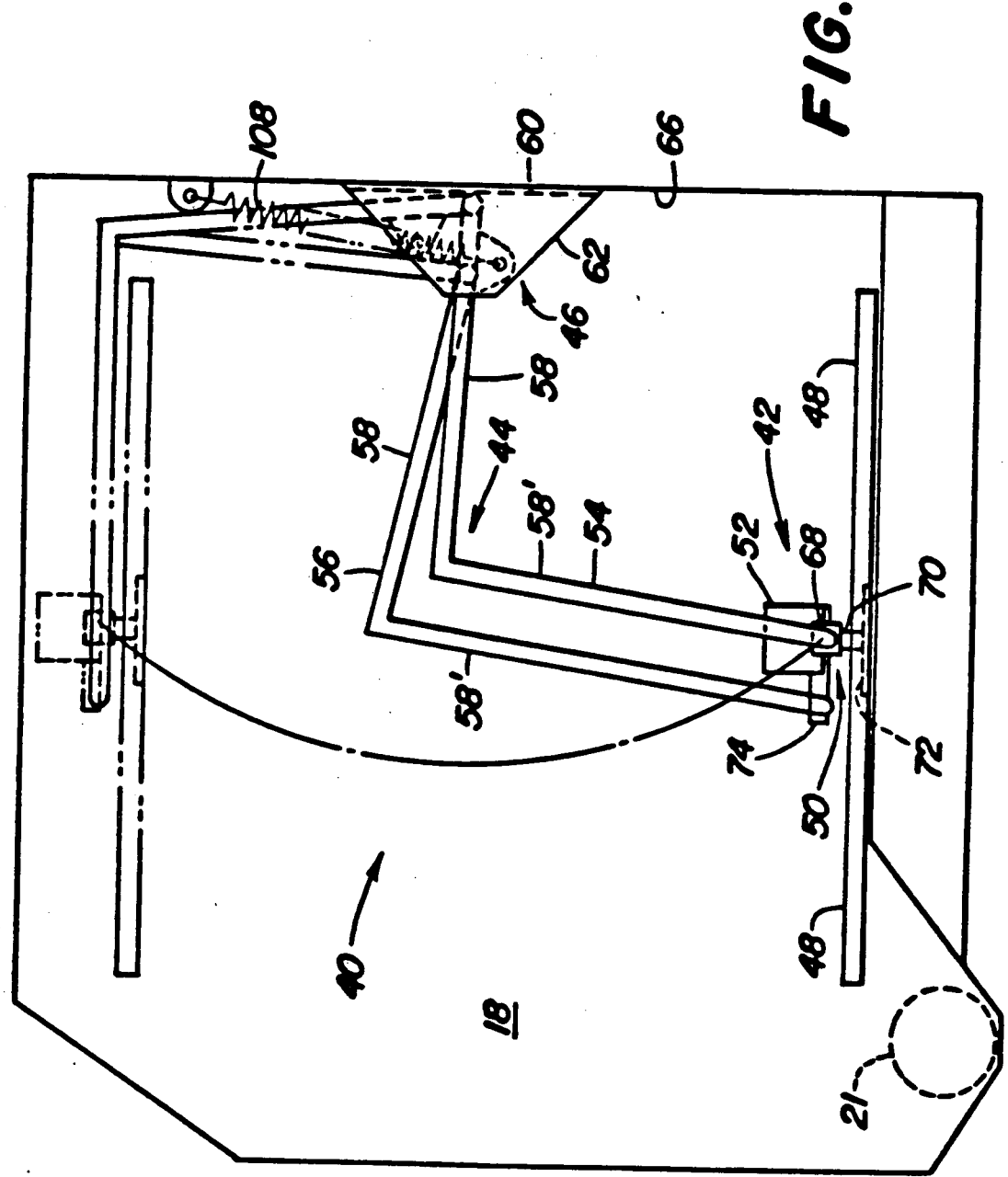
FIG. 7 shows a side view of the container of FIG. 1 having a spring control device.

In another embodiment illustrated in FIG. 7, the control device may be configured as a spring 108, which substantially supports the weight of conveyor arrangement 42 so that it makes contact with the crop deposit with only a small fraction of its weight, but is still able to follow it closely. Contact pressure varying with the height of the crop deposit can be obtained by selection of the spring characteristic and the arrangement of the spring. The spring may comprise a helical extension spring or a gas spring.

Figure 8:
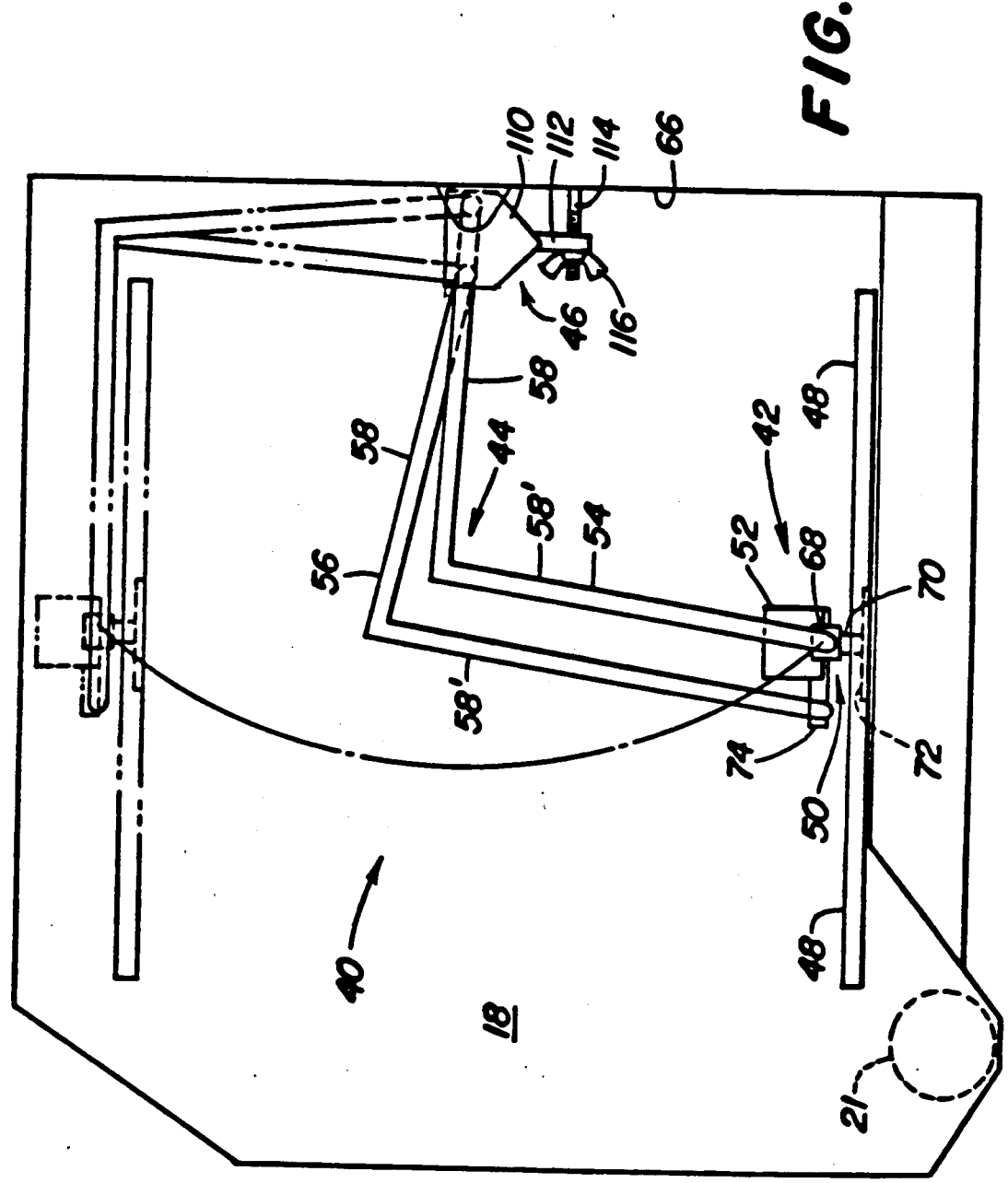
FIG. 8 shows a side view of the container of FIG. 1 having a screw operated control device.

FIG. 8 discloses a system for changing the inclination of the conveyor arrangement. This is accomplished by adjusting the pivot point of segment 58. The system comprises a bracket 110 having a downwardly depending tang 112 through which is positioned threaded screw 114. By adjusting thumb nut 116, the relationship of the pivot points are changed resulting in a change in inclination of the conveyor.

FIG. 5 shows conveyor arrangement 42 configured as a scraper chain conveyor, which corresponds in its general operation to the embodiments described above, but which differs in the details of conveyor elements 48 and conveyor element carrier 50.

This conveyor arrangement 42 includes frame 76, two shafts 78 with sprockets 80 and endless chain drive 82.

Frame 76 is configured as a tubular frame with two longitudinal carriers 84, three transverse carriers 86 and two attachment plates 88.

The ends of longitudinal carriers 84 are each provided with a bearing, not shown, which rotatively support shafts 78, and are spaced at a distance approximately equal to the length of shafts 78. Transverse carriers 86 extend between longitudinal carriers 84 and are rigidly connected thereto and provide torsional rigidity for frame 74.

Attachment plate 88 is rigidly connected to the center of each longitudinal carrier 84, and extends from these through the space between the two legs of chain drive 82. The attachment plates 88 are provided with two bearings, that are pivotally coupled to support arms 54" and 54'''. The bearings are arranged above one another and form a four-bar linkage with the pivots of arms 54", 54''' in mount 46. The four-bar linkage permits the adjustment of the conveyor arrangement 42 in a plane parallel to itself.

The frame 76 may also be equipped at one end with a deflector, not shown, extending horizontally below which the crop deposit is conveyed and which moves conveyor arrangement 42 upward by floatation.

Shafts 78 are rotatably supported from and extend across the width of longitudinal carriers 84. One of the shafts is rigidly connected to motor 52, such as by a chain, a bevel or face gear, a belt or by another coupling, and motor 52 itself is attached to frame 76.

Sprockets 80 are rigidly attached, to the end regions of shafts 78 and engage chain drive 82.

Motor 52 through a chain drive drives shaft 78 and associated sprocket 80 located on the right hand side of FIG. 5. Sprocket 80 on the left hand side of FIG. 5 is driven by chain drive 82.

Chain drive 82 consists of at least two chains 90 having conveyor elements 48' attached thereto and configured as blades. Chains 90 are composed of conventional chain links 92 whose spaces are engaged by the teeth of sprocket 80.

Conveyor elements 48' are attached at each end to one chain link 92 on each of the chains and hence are carried along when chains 90 are driven. Conveyor elements 48' are flanged to reinforce and improve their conveying capacity. In addition, flanging conveyor element 48' provides for a variation of the conveying performance when driving chain drive 82 in opposite directions. This or similar shaping of conveyor elements 48' the conveying direction into components directed upward and forward, so that conveyor arrangement 42 is pushed upwards during the conveying and distribution process. In addition, conveyor elements 48' may be provided with guiding or conveying attachments that are wedge-shaped or inclined, which transport the crop deposit to the side.

The connection of conveyor elements 48' to chains 90 may be rigid, as illustrated in FIG. 5, or pivotal as illustrated in FIG. 10. The pivotal conveyor elements 48' of FIG. 10 are pivotally coupled to chain links 92 at pivot 120. This provides conveying action in one direction of conveyor arrangement 42, while in the other direction conveyor elements 48' lie against the chain 90, resulting in no build-up of crop deposit and minimizing conveying resistance.

Linkage 44' is composed of arms 54", 54''', which are different from those of the first embodiment and which are arranged so that frame 76 is adjusted with chain drive 82 in planes that are parallel to each other. Motor 52 and the control devices used with the first embodiment are also applicable to this embodiment.

In both embodiments, conveyor system 40 will display the following characteristics:

The relative position of conveyor arrangement 42 may be utilized as an indication of the degree of filling of container 18 whose signal may be transmitted to operator's cab 16 by mechanical means, such as a rope pull, or electrically. A full signal may also be used to turn off the thresher or to turn on warning lights; or a range of signals for different points of time or degrees of filling may be used.

Where a cover arrangement is provided for container 18, conveyor arrangement 42 may be brought into contact with the cover arrangement in its upper end position and raise the cover for the time of the filling of the upper region.

Some or all of conveyor elements 48 and 48' may be equipped with brushes, rubber strips or the like, which, for one, can provide excellent cleaning of the bottom of container 18 and, for another, avoid damage to it, when they come into contact at the end of the run.

Between motor 52 and conveyor elements 48, 48' an overload safety device may be used, such as a limited slip clutch, which may provide an advantage with crops that are difficult to move such as corn cob mixtures.

The rotational speed of motor 52 may be lower during the filling process than during the unloading, since during filling the main requirement is for proper distribution, while during unloading proper guidance of the crop is important. During the filling process, 30 to 100 revolutions of journal 70 may be adequate.

The description of the operation begins with the first embodiment and condition shown in FIG. 2. Container 18 is empty, unloading arrangement 21 is turned off and crop is delivered to the container 18 through openings near its top, by means of a clean grain elevator, not shown. The crop deposit starts to accumulate at the bottom of container 18.

As soon as crop is delivered; or at a later time determined by sensors and a control system; or as soon as a control signal is given, motor 52 is supplied with hydraulic fluid under pressure so that it begins to turn. The starting point may also be controlled by a time delay relay. Conveyor elements 48 are put into motion and traverse the circular plane illustrated in FIG. 4. While conveyor elements 48 are moved across the circular plane, they are in contact with the crop deposit upon which conveyor arrangement 42 is supported. Conveyor elements 48 move part of the crop outward by means of centrifugal force, in order to form a flat surface. By this means, areas otherwise not accessible are filled.

As more crop is delivered, the higher is the cone of repose, and the higher conveyor arrangement 42 moves upward, since it is either swimming upon the crop deposit or is raised by means of the control device. As soon as it has reached its upper end position, motor 52 is turned off either automatically or by a switch controlled manually; harvesting machine 10 carrying container 18 is driven to an unloading point; and the drive to unloading arrangement 21 activated so that the crop deposit can be extracted from container 18. During the early part of the unloading process, motor 52 could continue to operate; this energy consumption is, however, in most cases unnecessary, since the crop initially will flow towards the unloading arrangement by reason of its own weight. As soon as the remaining crop deposit no longer flows by itself to unloading arrangement 21 and/or a so-called bridging takes place, motor 52 is again activated and moves the crop deposit to unloading arrangement 21. This process ends only when the crop deposit has been completely unloaded and conveyor arrangement 42 makes contact with the bottom of container 18. It is particularly evident from FIG. 2 that container 18 does not require any slope in the area covered by conveyor elements 48; slopes should be provided in those areas in which the crop deposit is not reached by conveyor elements 48.

I claim:

1. A conveyor system for a grain tank of an agricultural harvesting machine, the grain tank being adapted to hold grain processed by the agricultural harvesting machine, the conveyor system comprising a conveyor arrangement mounted to the grain tank of an agricultural harvesting machine for distributing grain within the grain tank, a motor for driving the conveyor arrangement, and means for vertically moving the conveyor arrangement in the grain tank during a conveying operation, the conveyor arrangement is vertically moved by the accumulation of grain in the grain tank acting on the conveyor arrangement as the conveyor arrangement is being driven by the motor.

2. A conveyor system as defined by claim 1 wherein the conveyor arrangement is provided with a plurality of conveyor elements for conveying the grain, these conveyor elements defining a plane, the means for vertically moving the conveyor arrangement moves the conveyor elements in parallel planes as it is moved vertically.

3. A conveyor system as defined by claim 2 wherein the means for vertically moving the conveyor arrangement is pivotally mounted to said grain tank.

4. A conveyor system as defined by claim 3 further comprising a control device that is positioned between the grain tank and the conveyor arrangement.

5. A conveyor system as defined by claim 4 wherein the control device comprises a spring which controls the contact pressure of the conveyor arrangement on the crop material.

6. A conveyor system as defined by claim 3 wherein the motor for driving the conveyor arrangement moves vertically with the conveyor arrangement.

7. A conveyor arrangement as defined by claim 6 wherein the plane defined by the conveyor elements can be adjusted into different inclinations relative to a horizontal plane.

8. A conveyor system as defined by claim 1 wherein the conveyor arrangement is provided with a plurality of conveyor elements that are provided with guiding means for guiding grain during a conveying operation.

9. A conveyor system as defined by claim 1 wherein the conveyor arrangement is configured as a rotor which is provided with a plurality of flexible conveyor elements for contacting and conveying the grain.

10. A conveyor system as defined by claim 1 wherein the conveyor arrangement is configured as a rotor which is provided with rigid conveyor elements for contacting and conveying the grain.

11. A conveyor system as defined by claim 9 wherein the rotor is provided with a rotor axis that is pivotable about a horizontal axis.

12. A conveyor system as defined by claim 10 wherein the rotor is provided with a rotor axis that is pivotable about a horizontal axis.

* * * * *